United States Patent
Sawyer et al.

(10) Patent No.: US 6,867,376 B2
(45) Date of Patent: Mar. 15, 2005

(54) GLOW RODS WITH EXTERNALLY MOUNTABLE ANCHORING MEMBERS AND RELATED METHODS

(75) Inventors: Charlie Sawyer, Orlando, FL (US); Isaac D. White, Orlando, FL (US); James E. Dickens, Orlando, FL (US); Blake Urban, Lenoir, NC (US); Kevin Forsberg, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 23 days.

(21) Appl. No.: 10/417,603

(22) Filed: Apr. 17, 2003

(65) Prior Publication Data

US 2004/0206529 A1 Oct. 21, 2004

(51) Int. Cl.$^7$ .......................... E21C 29/16; H01B 17/00
(52) U.S. Cl. ................... 174/135; 174/48; 174/101; 254/134.3 FT; 254/134.3 R
(58) Field of Search ..................... 174/48, 49, 65 R, 174/65 SS, 65 G, 68.1, 68.3, 69, 72 C, 73.1, 96, 98, 100, 101, 138 B, 138 E, 138 G, 138 R, 135; 254/134.3 FT, 134.3 R, 134.6

(56) References Cited

U.S. PATENT DOCUMENTS

| | | | |
|---|---|---|---|
| 2,241,576 A | 5/1941 | Barton | |
| 2,410,753 A | 11/1946 | Shinomiya | |
| 3,625,084 A | 12/1971 | Low | |
| 4,033,618 A | 7/1977 | Lamb | |
| 4,077,609 A | 3/1978 | MacFarlane | |
| 4,272,860 A | 6/1981 | Hinton | |
| 4,273,111 A | 6/1981 | Tsukaya | |
| 4,618,124 A | * 10/1986 | Flowers | 254/134.3 FT |
| 5,016,504 A | 5/1991 | Brunnetto | |
| 5,219,198 A | 6/1993 | Davis | |
| 5,297,443 A | 3/1994 | Wentz | |
| 5,922,995 A | * 7/1999 | Allen | 174/95 |
| 6,089,892 A | * 7/2000 | Snow et al. | 439/217 |
| 6,257,808 B1 | * 7/2001 | Groot | 408/1 R |
| 6,293,519 B1 | 9/2001 | Farretta | |
| 6,691,985 B1 | * 2/2004 | El Haddad | 254/134.3 FT |

OTHER PUBLICATIONS http://www.sandman.com/install.html, *Gopher Pole*, 7 sheets, © 2001, printed Feb. 11, 2003.
http://www.midsouthcable.com/drillbits_images.htm, *MIDSOUTH Wire and Cable Company, Drill Bits/Glo–Rods Images Gallery*, 4 sheets, © 2003, printed Feb. 11, 2003.
http://www.swmud.org/help/things/glow_rod.html, *Star Wars Glow Rod*, 1 sheet, printed Feb. 11, 2003.

* cited by examiner

Primary Examiner—Dean A. Reichard
Assistant Examiner—Adolfo Nino
(74) Attorney, Agent, or Firm—Myers Bigel Sibley & Sajovec PA (57) ABSTRACT

Rod assemblies for guiding, routing or feeding a wire and/or cable in a target space of an existing structure having a plurality of frame members and a target internal routing space for the cable or wire, include: (a) an elongate rod having opposing first and second end portions; and (b) an anchoring member attached to the rod first end portion. In position, the anchoring member resides against a surface of a structural frame member to hold the first end portion outside of the target internal routing space and allow the second end portion to extend into the target internal routing space, thereby allowing one end of the rod to remain in a fixed location without requiring a second installer. The elongate rod can be a glow rod.

26 Claims, 8 Drawing Sheets

GLOW RODS WITH EXTERNALLY MOUNTABLE ANCHORING MEMBERS AND RELATED METHODS

FIELD OF THE INVENTION

The present invention relates to implements or devices for pulling, guiding, or directing cables and wires in structures, and may be particularly suitable for glow rods.

BACKGROUND OF THE INVENTION

Implements or devices have been used to install or route electrical wires and cables in existing structures in various buildings, houses, or other structures. These devices help an installer route or guide the wires and/or cables within existing cavities, ceilings, trusses, attics, trailers, studs, conduits, walls, framed regions, or other structural spaces between or within structures (such as "blind" or tightly bound spaces). The devices or implements can include rods, an electrician's "snake" or semi-flexible rod or "fish" tape. Co-pending, co-assigned U.S. patent application Ser. No. 10/307,058, entitled Apparatus and Method for Routing Cables and Wires, describes an exemplary apparatus for routing and guiding cables and/or wires. The content of this application is hereby incorporated by reference as if recited in full herein.

Thin long rods have been used to "fish" or guide the cable or wire in crawl spaces or other tightly bound spaces. The glow rod is an elongate thin pole-like device that can be used to "fish" or direct a cable or wire in the router space. One type of rod used to route cables and/or wires is a glow rod. A glow rod is typically configured to be a light-weight device with sufficient rigidity so as to be able to engage and direct a wire or cable to be routed as desired. Certain types of glow rods can generate light through chemical phosphorescence; others are electroluminescent rods that can be internally or externally illuminated. The glow rod may be formed of a transparent or translucent fiberglass material. The glow rod may be between about 5–20 feet long, or longer, and have a relatively small diameter, such as, for example about 0.25–0.5 inches. Certain glow rods may have about a 1 cm diameter and be about 6 feet long. Exemplary glow rods are GLO-RODS available from MidSouth Wire and Cable Company, located in Winston-Salem, N.C.

Unfortunately, use of typical glow rods may require two installers, one on each end of the device in order to use the rod to route the wire and/or cable into the desired position. That is a first installer is required at the entry site to hold the rod as it fishes to an exit site and the other installer is at the exit site where he/she locates the glow rod and then attaches a cable or wire to the rod. The second installer then retrieves the glow rod with the attached wire or cable and routes the glow rod holding the wire or cable through the router space and out through the rod original entry site.

SUMMARY OF THE INVENTION

Embodiments of the present invention provide anchoring members that can be attached to one end portion of a rod to secure the rod externally against a fixed structure (ceiling, stud, wall, beam and the like), while allowing the rod to extend within the target installation space, which, in turn, can permit a single installer to move to a different location, with the rod held in place at the secured location to guide the cable and/or wire in the installation space.

The present invention may be particularly suitable for anchoring glow rods during cable or wire installation in a building.

Certain embodiments of the present invention are directed to rod assemblies for guiding, routing or feeding a wire and/or cable in a target space of an existing structure having a plurality of frame members and a target internal routing space for the cable or wire. The rod assemblies include an elongate rod having opposing first and second end portions and an anchoring member attached to the rod first end portion. In position, the anchoring member resides against a surface of a structural frame member to hold the first end portion outside of the target internal routing space and allow the second end portion to extend into the target internal routing space. The configuration allows one end of the rod to remain in a fixed location without requiring a second installer to hold that end during the installation and/or allowing a single installer to use the rod to position the cable or wire.

Other embodiments are directed to methods for routing or guiding a cable or wire in a target routing space of a structure. The methods include: (a) inserting a rod having opposing first and second end portions into a first aperture formed in a structural member of a structure, the first aperture allowing access to target routing space, so that the second end portion travels through the aperture into the target routing space; and (b) anchoring the first end portion to the structural member so that the first end portion resides external to the first aperture and remains fixed in position.

The method can also include directing the second end portion of the rod to exit the target routing space at a second aperture formed in the structure at a position that is spaced apart from the first aperture.

The anchoring step can be carried out by: (a) affixing an anchoring member to the wall, stud and/or beam so that the anchoring member holds the rod therein; and (c) securing the anchoring member to the rod first end portion so that the first end portion resides above or outside the aperture and the target routing space. The anchoring member can be secured to the rod in advance or after affixing it to the wall, stud or beam.

Still other embodiments of the present invention are directed to kits for a glow rod. The kits include an anchoring member sized and configured to engage a rod channel that is configured to receive and attach to a first end portion of a glow rod and to hold the first end portion of the glow rod above a target routing space in a structural member (such as, but not limited to, a beam, stud, wall, truss, ceiling or other frame structure) while allowing the second end portion of the rod to be directed to travel through the target routing space.

The kits can be used to retrofit glow rods in use in the field or provided as an accessory item with glow rods to allow for use of the anchoring member at desired installation sites. In certain embodiments, the anchoring member is configured to releasably attach to the glow rod during use and is detachable from the rod for storage after use.

In particular embodiments, the kit can include a collar sized and configured to securely attach to the elongate rod first end portion. In position, the collar extends radially outward from the rod.

Other embodiments are directed to rod assemblies for guiding, routing or feeding a wire and/or cable in a target space of an existing structure having a plurality of frame members and a target internal routing space for the cable or wire. The assembly includes an elongate rod having opposing first and second end portions and means for mounting the elongate rod so that a selected one of the first or second end portions resides against a surface of a structural frame member to hold the selected rod end portion outside of a target internal routing space and allow the opposing end portion to extend into the target internal routing space.

The foregoing and other objects and aspects of the present invention are explained in detail herein.

DETAILED DESCRIPTION OF EMBODIMENTS OF THE INVENTION

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. In the drawings, layers, regions, or components may be exaggerated for clarity. In the figures, broken lines indicate optional features unless described otherwise. The method steps are not limited to the order in which they are set forth.

Figure 1:
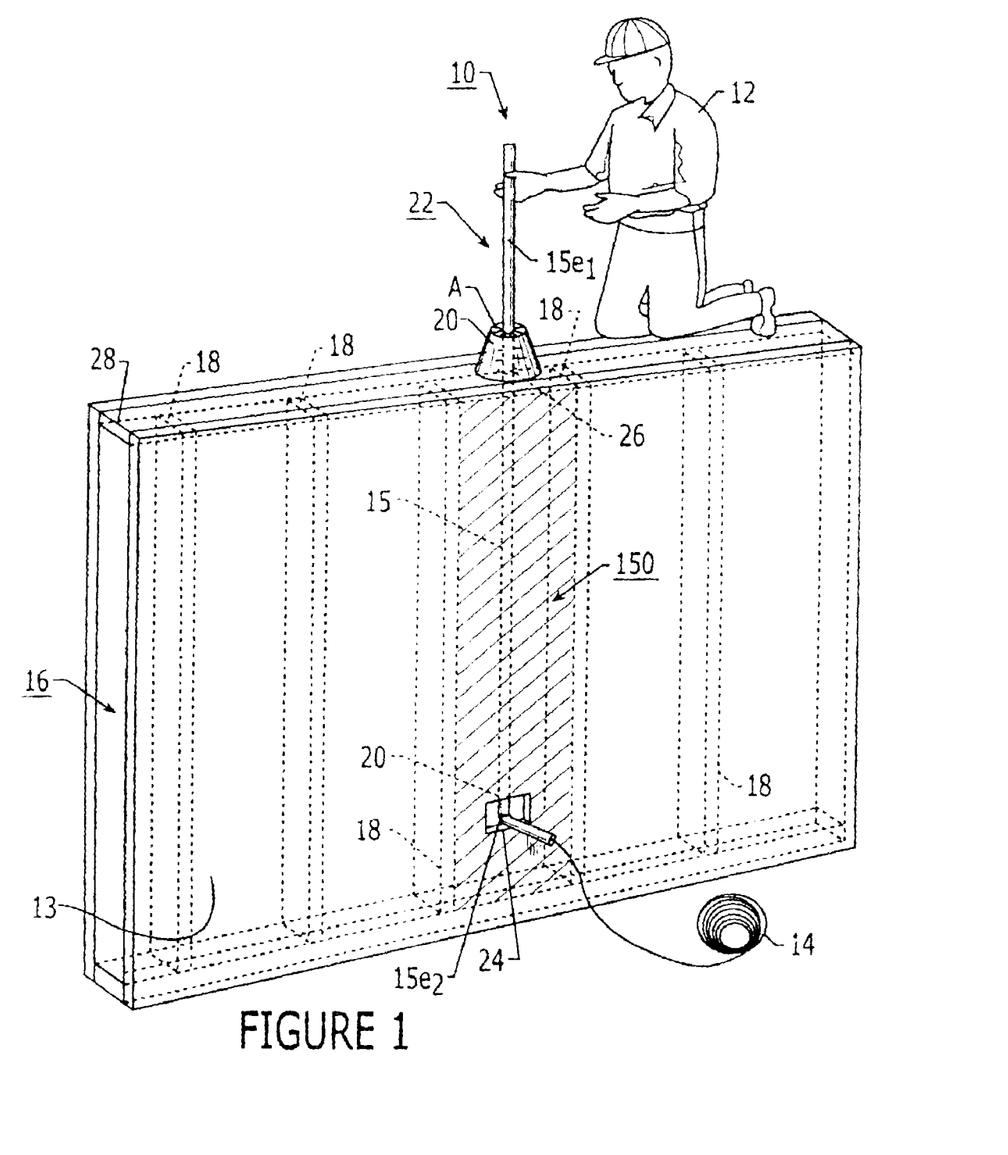
FIG. 1 is a schematic illustration of one type of installation that can be carried out using rod assemblies according to embodiments of the present invention.

The present invention is directed to devices such as long slender rods used to install or route electrical wires and cables in existing structures such as buildings (houses, offices, hospitals, clinics) or other structures. The devices help an installer route or guide the wires and/or cables in router spaces of interest within existing cavities, ceilings, trusses, attics, trailers, studs, conduits, walls, framed regions, or other structural spaces between or within structures (such as "blind" or tightly bound spaces). The router space of interest may include an entry point that is a drilled, chiseled, or cut opening in a stud, wall or other frame member. The router space of interest is typically the space between upstanding walls or between a wall and an unfinished framed portion (truss, ceiling, attic and the like). As shown in FIG. 1, the wall 16 can include one or more vertical studs 18 and a horizontal stud 28 (or header) with a sheet rock or dry wall face 13 and target router space 150 behind the sheet rock face 13 and between adjacent vertical studs 18.

FIG. 1 illustrates the exemplary use of a rod assembly 10 with an elongate rod 15 and anchoring member 20. As shown, the rod 15 includes two opposing end portions $15e_1$, $15e_2$. The anchoring member 20 may be located proximate either the first end portion $15e_1$ (shown as location "A") and/or the second end portion $15e_2$ (shown as position "B"). As shown, at least one end portion $15e_2$ of the rod assembly 10 is configured to attach to a cable or wire 14 that is to be positioned in the router space 150.

Figure 2:
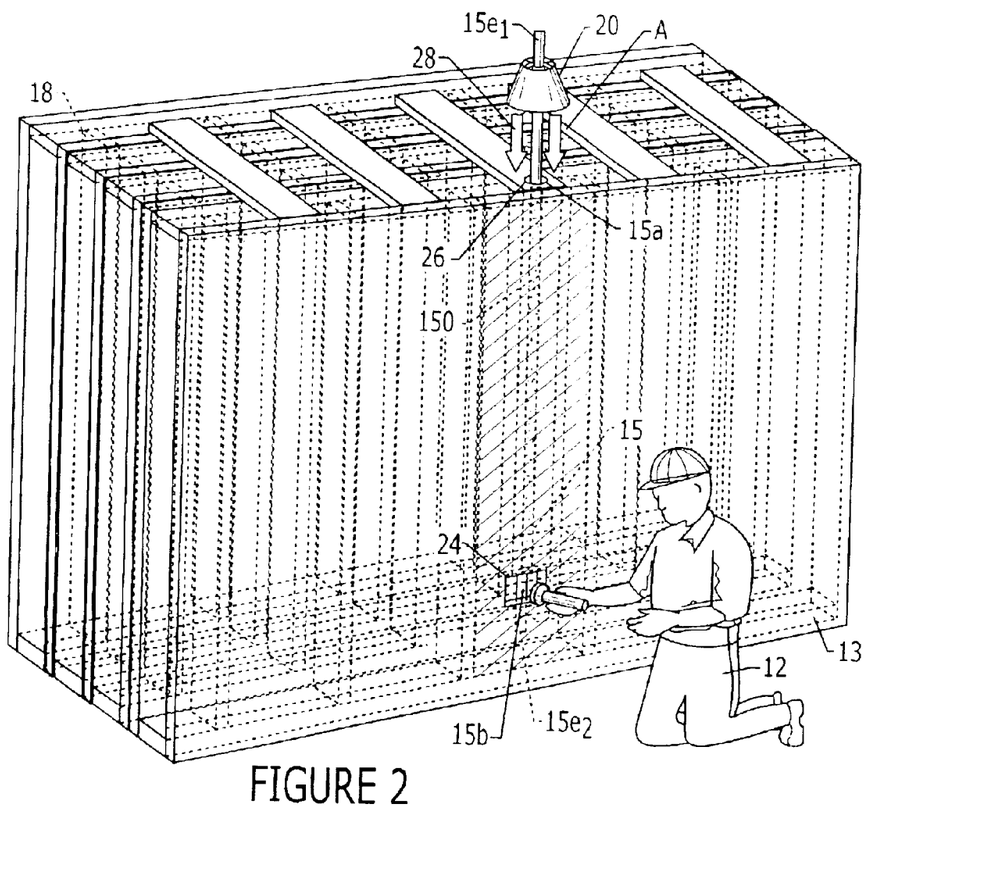
FIG. 2 is a schematic illustration of another exemplary installation according to embodiments of the present invention.

FIG. 2 illustrates the anchoring member 20 held in the upper position "A" with the rod inserted in a first aperture 15a while the technician or installer is able to access the other end of the rod $15e_2$ in the router space 150 via a second aperture 15b. In use, the technician can view through the opening 15b to find the position of the rod 15. In particular embodiments, the rod 15 is an elongate glow rod and the technician may shine a light into the router space 150 and the rod 15 can glow in response thereto, or the glow rod may generate its own light without such external input. The technician or installer can then connect the rod 15 to the cable or wire 14 and return to the upper position to fish or pull the cable or wire 14 through the router space 150 without requiring the use of a second technician to install the wire or cable.

In any event, the installer 12 can use the rod 15 to route or "fish" the cable or wire from an upper location 22 (such as a ceiling, attic or upper floor) to a lower location 24, typically associated with a wall outlet or terminal jack (not shown). The installation can also be carried out in reverse order and/or by mounting the anchoring member 20 at the lower location.

The rod 15 may be a relatively thin rod having a length that is between 5–10 feet or longer. In particular embodiments, the rod 15 will have sufficient rigidity to be able to guide or fish a wire through the desired router space 150 and can have a diameter that is less than about 1 inch, and more typically is between about 0.25–0.33 inches.

Figures 3A, 3B, 3C:
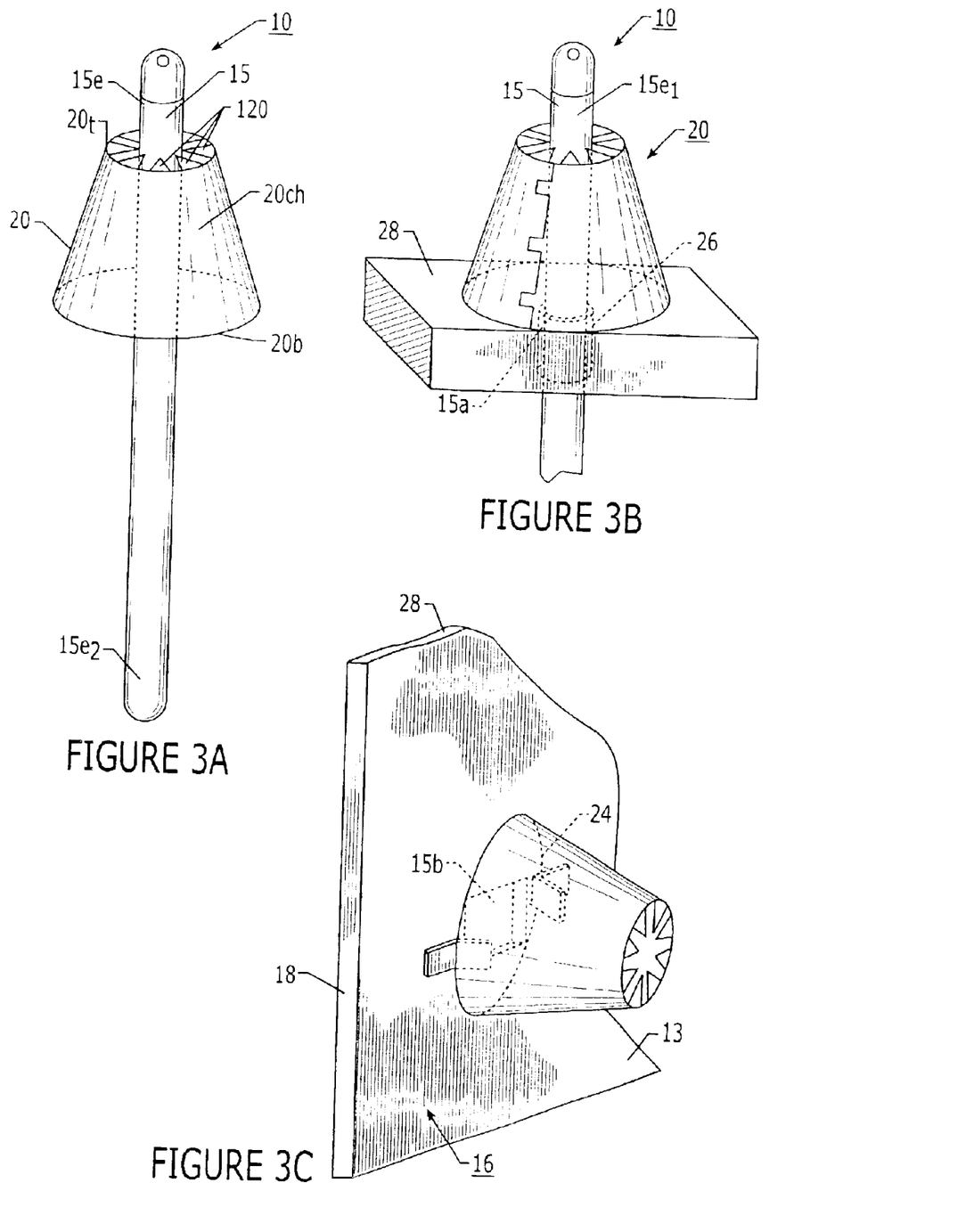
FIG. 3A is a front view of a rod assembly with an anchoring member according to embodiments of the present invention.
FIG. 3B is a front view of the rod assembly of FIG. 3A shown positioned over a horizontal stud according to embodiments of the present invention.
FIG. 3C is a schematic illustration of a rod assembly similar to that shown in FIG. 3A inserted through an aperture formed in an upstanding wall according to embodiments of the present invention.

FIG. 3A illustrates one embodiment of a rod assembly 10. As shown, the anchoring member 20 has a frustoconical shape with opposing top and bottom portions 20t, 20b, respectively, that define a rod channel 20ch therebetween. The bottom portion 20b of the anchoring member 20 is configured to overlie the wall, beam, stud, ceiling or other entry region or port into the router space 150. As such, the bottom portion 20b of the anchoring member 20 has a width that is larger than the width of the aperture 26 (FIG. 3B) or other access port in the rod entry location into the router space 150. The top portion 20t of the anchoring member 20 is sized and configured to cooperably engage with a first end portion 15e, of the rod 15. The top end portion 20t of the anchoring member 20 may be configured to frictionally engage the rod end portion $15e_1$. As shown in FIG. 3A, the top portion 20t of the anchoring member 20 may include laterally extending baffle segments 120 that frictionally engage the rod 15 to hold the rod in position in the anchoring member 20 while the technician is at the second routing (egress) location.

FIG. 3B illustrates the anchoring member 20 positioned on the top of a wall on a horizontal stud or header 28. A through aperture 26 is formed in the header or stud 28. The rod 15 is inserted through the aperture 26 and the anchoring member 20 engages with the top surface of the stud 28 to hold the first end portion $15e_1$ of the rod 15 in place above the stud 28, thereby allowing the rod 15 to extend downwardly through the router space 150 to the egress or cable/wire exit location.

FIG. 3C illustrates an alternative installation procedure in which the anchoring member 20 is positioned against an upstanding wall and allows the rod 15 to enter laterally into the router space 150 and then travel upwardly to the exit location.

Figure 3D:
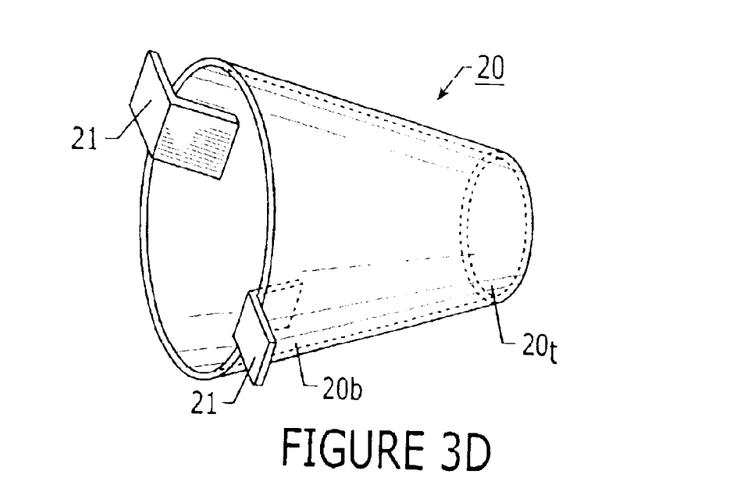
FIG. 3D is an end perspective view of an alternative embodiment of the anchoring member shown in FIG. 3A.

FIG. 3D illustrates that the anchoring member 20 may include brackets at the bottom portion 20b to help hold the anchoring member 20 in place when used for side entries. The brackets 21 may be attached to the wall 16 proximate the aperture 24 location using screws, nails or other attachment members. In other embodiments, the brackets 21 can be configured as spaced apart spring loaded clamps or fingers 21c that can pinch the thickness of the dry wall or sheet rock to hold the anchoring member 20 in position (not shown).

Figure 4A:
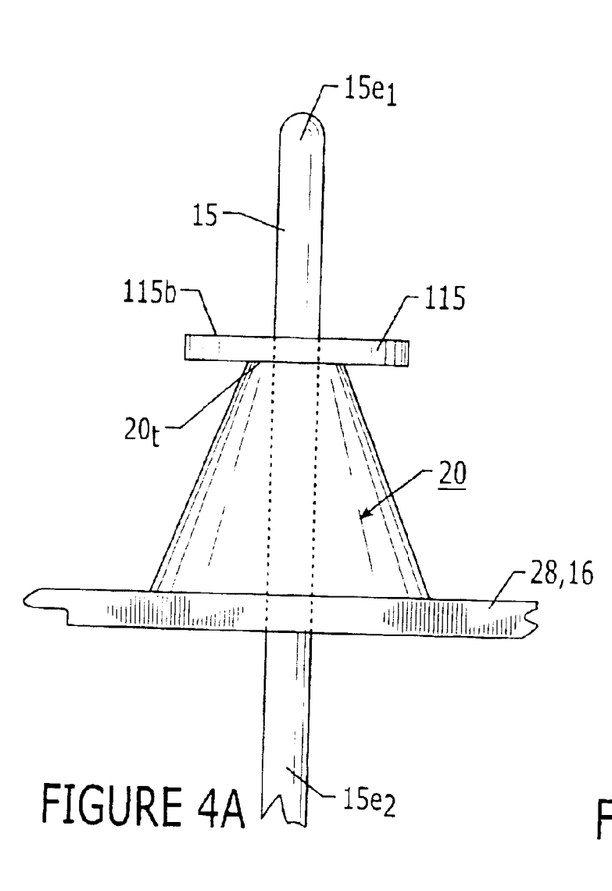
FIG. 4A is a schematic front view of a rod with an anchoring member and a stop collar according to embodiments of the present invention.

FIG. 4A illustrates another embodiment of a rod 15 with an anchoring member 20. This embodiment includes a stop collar 115 attached to the first end portion $15e_1$ of the rod 15. The stop collar 115 may be configured to extend radially outward about the entire perimeter of the rod 15 or may be configured as discontinuous segments that project outwardly to form the desired stop engagement. The stop collar 115 is configured to cooperably engage the top portion 20t of the anchoring member 20 to inhibit the rod first end portion $15e_1$ from advancing into the entry or egress aperture and into router space 150. The collar 115 may be configured as two or more outwardly extending bars 115b as shown in FIG. 4A. The bars 115b can be sized to extend a distance beyond the opening at the top portion 20t of the anchoring member 20. The collar 115 may frictionally or matably engage the anchoring member 20 as described above. In other embodiments, the collar 115 may be configured to contact the anchoring member 20 without frictional or matable engagement.

Figure 4B:
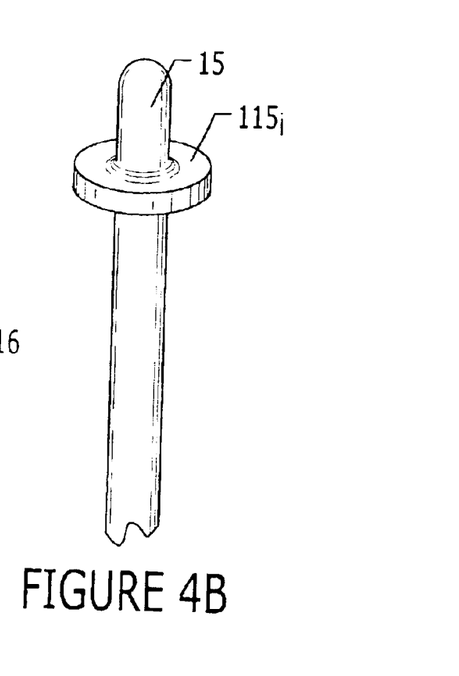
FIG. 4B is a front view of an anchoring member and rod configuration with a stop collar similar to that shown in FIG. 4A.
Figure 4C:
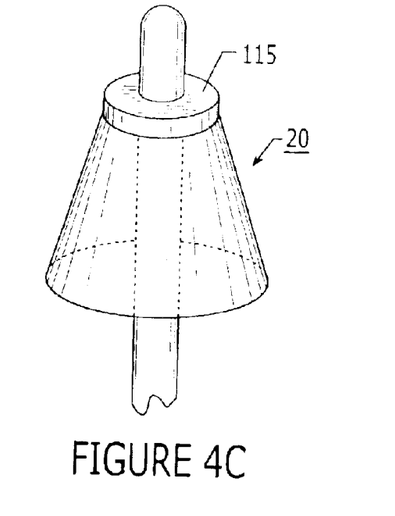
FIG. 4C is a schematic front view of a partial rod with anchoring member according to other embodiments of the present invention.
Figure 4D:
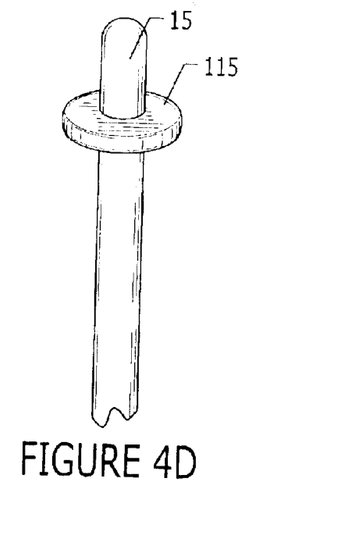
FIG. 4D is a partial front view of a rod assembly that illustrates that the collar may be configured to reside on the rod according to embodiments of the present invention.
Figure 4E:
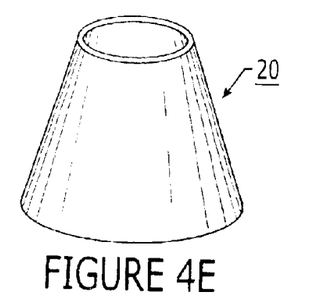
FIG. 4E is a front view of an example of a frustoconical anchoring member.

FIG. 4B illustrates that the collar 115 may be an integrally formed collar 115i on the rod 15 itself. FIG. 4C illustrates that the anchoring member 20 may hold the collar 115 thereon and be sized to frictionally engage the rod 15 during use or assembly. FIG. 4D illustrates a collar 115 formed by an elastomeric ring. FIG. 4E illustrates that the anchoring member 20 may have an open top portion that is sized and configured to receive the rod 15 while inhibiting advancement of the rod above the stop collar 115 into the entry or egress aperture in the structure routing space 150.

Figure 5A:
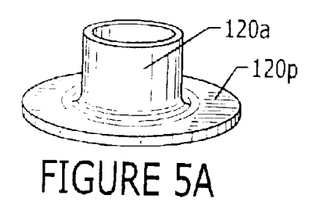
FIGS. 5A–5F are front views of examples of differently shaped anchoring members according to embodiments of the present invention.
Figure 5B:
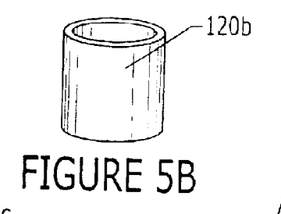
Figure 5C:
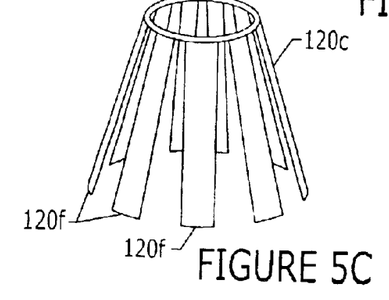
Figure 5D:
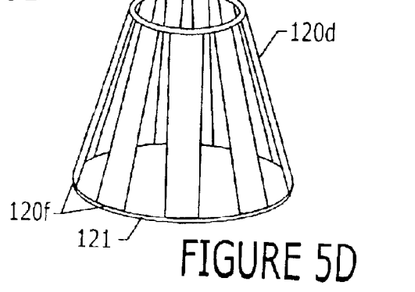
Figure 5E:
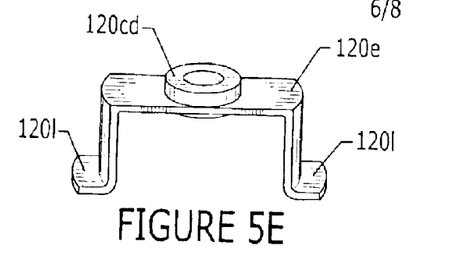
Figure 5F:
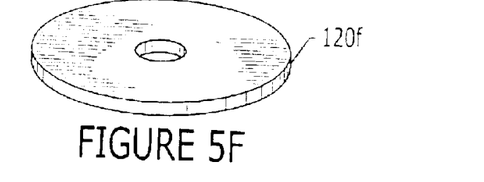

FIGS. 5A–5F illustrate different embodiments of anchoring members 20 that are sized and configured with rod channels that receive and/or hold a portion of the rod 15 therein. FIG. 5A illustrates an anchoring member 120a with a cylindrical body and a planar end segment that resides against the surface of the structure proximate the entry or egress aperture. FIG. 5B illustrates that a cylindrical body anchoring member 120b can be sized and configured to overlie the aperture and hold the rod. FIG. 5C illustrates an anchoring member 120c with a plurality of outwardly extending fingers 120f. The fingers 120f may be resiliently configured with sufficient rigidity to hold the rod 15 against the entry or egress surface in the structure. FIG. 5D illustrates an anchoring member 120d with a bottom edge portion 121 attached for structural reinforcement. FIG. 5E illustrates a stepped anchoring member 120e with a center disc portion 120cd that receives the rod 15 and lower side leg portions 120l that align the center disc portion 120cd over the target (ingress or egress) aperture and hold the anchoring member 120e on the structure surface. FIG. 5F illustrates a disc configuration that can be sized and configured to abut the aperture to hold the rod 15.

Figures 6A, 6C:
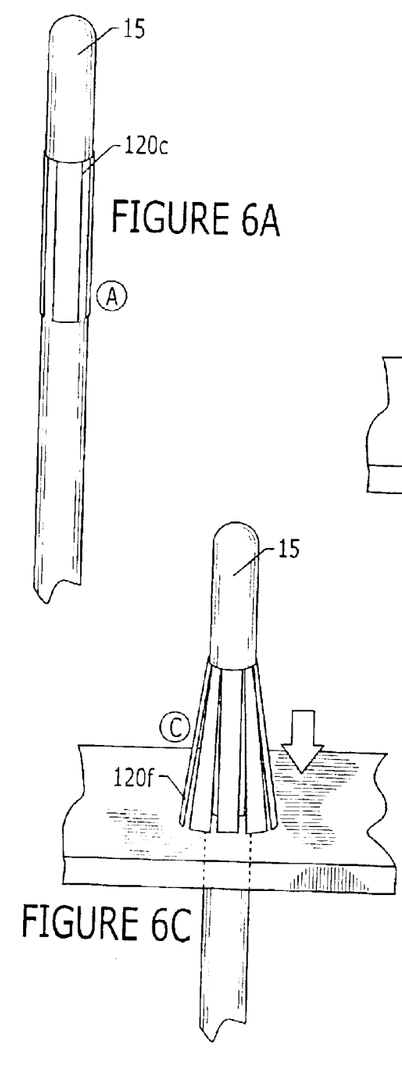
FIGS. 6A–6D are schematic illustrations of one sequence of operations that may be carried out according to embodiments of the present invention.
Figure 6B:
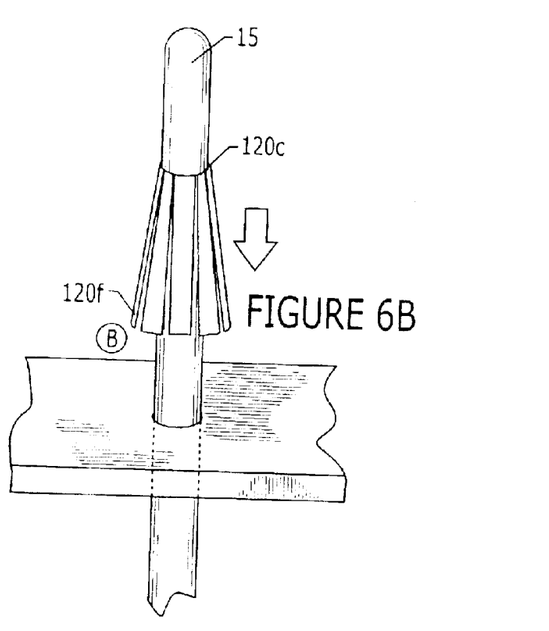
Figure 6D:
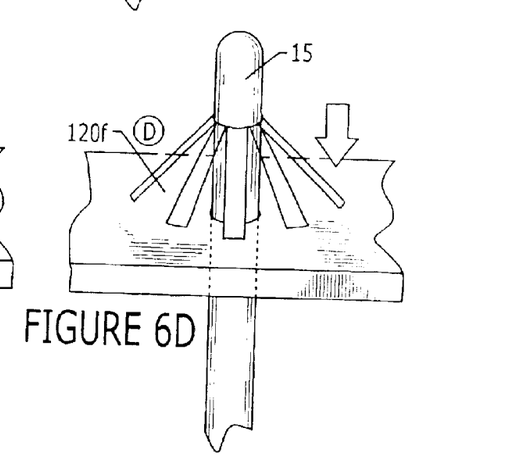
Figure 7A:
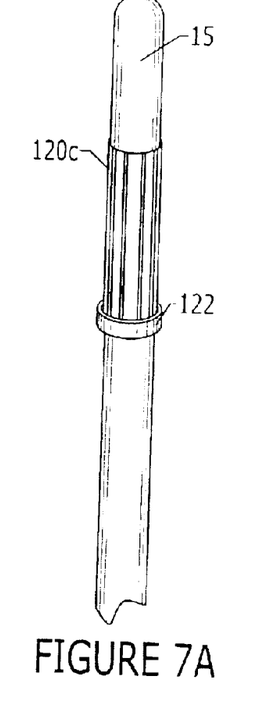
FIGS. 7A and 7B are partial front views of a rod assembly with extendable arms according to embodiments of the present invention.
Figure 7B:
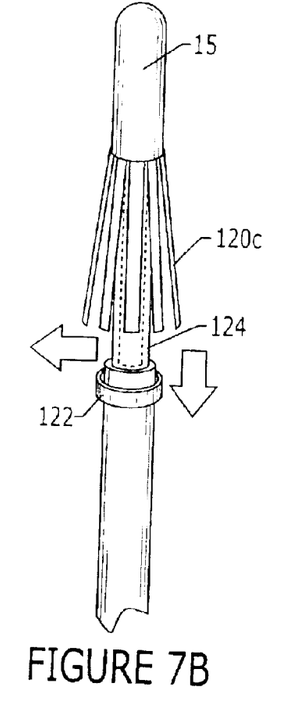

FIGS. 6A–6D illustrate a sequence of operations that can be carried out to position the rod 15 during an installation. The anchoring member 120c is shown by way of example. The fingers 120c may be formed of any suitable material and may be configured to expand outwardly upon contact with the mounting surface as shown in FIGS. 6C and 6D to hold the weight of the rod 15 so as to keep the rod 15 in the desired position. In particular embodiments, the anchoring member collar 120c may be formed of a resilient metal or elastomer. The fingers 120f may align with the body of the rod 15 during periods of non-use. As shown in FIGS. 7A and 7B, the fingers 120f may be held against the body of the rod 15 in a recess 124 so that the rod 15 and anchoring member 120c define a substantially straight side profile (with the fingers 120f substantially flush with the contour of the body of the rod). A holding member 122 may be used to hold the fingers in tight alignment and moved for deployment as also shown in FIGS. 7A and 7B.

Figure 8A:
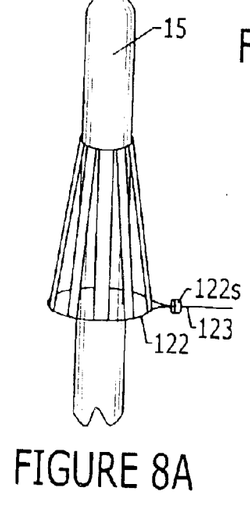
FIG. 8A is a partial front view of a rod assembly with an anchoring member having a skirt with a cord attached to a lower portion of the skirt according to embodiments of the present invention.
Figure 8B:
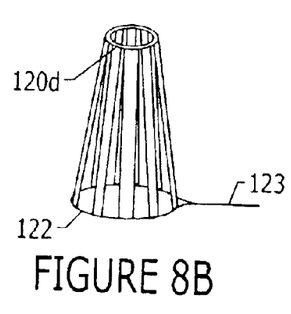
FIGS. 8B–8D illustrate that the skirt shown in FIG. 8A may be formed with a plurality of spaced apart segments with the cord configured to be able to gather and release the skirt segments to form the shape desired according to embodiments of the present invention.
Figure 8C:
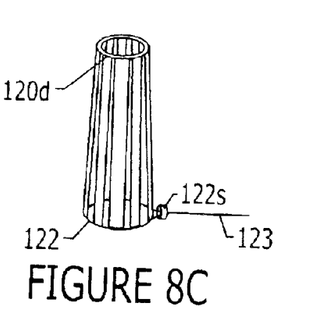
Figure 8D:
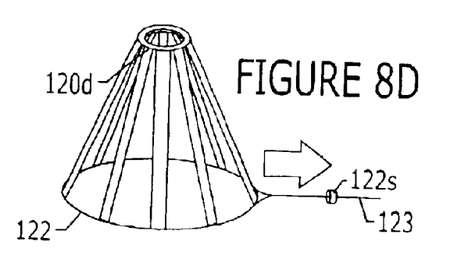

FIGS. 8A–8D illustrate the collar 120d shown in FIG. 5D with the attached bottom edge portion 121 provided by a cord 123. As used herein, the term "cord" includes string, wire, cable, fiber, strand(s) of materials, and the like. As shown, the cord 123 can be configured to adjust the degree of deployment of the fingers 120f. The cord 123 may include a cord stop 122s that defines the degree pf expansion allowed the bottom portion of the fingers 120f and/or that can be used to gather the fingers 120f into a storage configuration (with the fingers 120f arranged to abut as shown in FIG. 8C) similar to that shown in FIG. 6A or 7A.

Figure 9A:
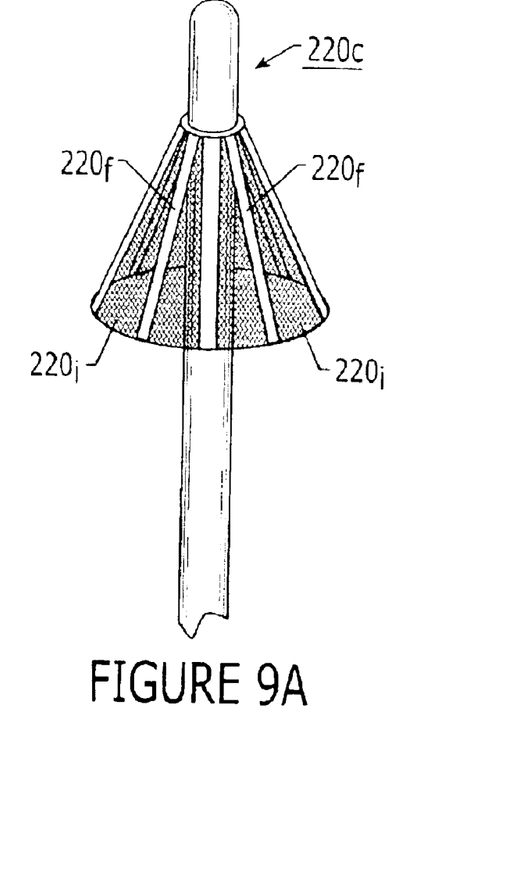
FIGS. 9A and 9B illustrate a continuous skirt configuration with segments that can resiliently stretch radially outward during use and then retract to their original disposition or shape during storage according to embodiments of the present invention.
Figure 9B:
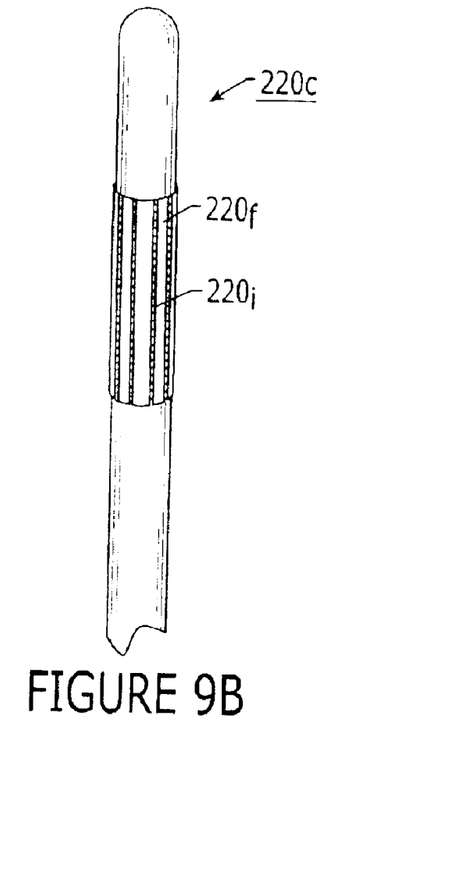

FIGS. 9A and 9B illustrate that the anchoring member 220c can be formed as a continuous skirt that can include a plurality of finger segments 220f separated by intermediate segments 220i. The finger segments 220f can be configured with increased rigidity (similar to the fingers noted above) relative to the intermediately positioned segments 220i. The intermediate segments 220i can be configured to laterally expand and retract (stretch and return) or to fold and/or pleat during periods of non-use. As such, the intermediate segments 220i can be formed of a different material than that of the finger segments 220. In particular embodiments, the intermediate segments 220i may be formed of stretchable fibers or fabrics such those that comprise spandex, other elastomeric materials, textile materials, or other resilient and/or elastically deformable materials.

An example of a stretch fiber is a synthetic manufactured fiber, such as spandex, in which the fiber forming substance is a long-chain synthetic polymer. As generally described in certain literature, it is believed that spandex typically comprises at least about 85% of a segmented-polyurethane. According to certain prior art sources, the polymer chain is a segmented block copolymer containing long, randomly coiled, liquid, soft segments that move to a more linear, lower entropy, structure. Generally stated, the hard segments act as "virtual cross-links" that tie all the polymer chains together into an infinite network. This network prevents the polymer chains from slipping past each other and taking on a permanent set or draw. When the stretching force is removed, the linear, low entropy, soft segments move back to the preferred randomly coiled, higher entropy state, causing the fiber to recover to its original shape and length. This segmented block copolymer is formed in a multi-step proprietary process. It is extruded into a fiber as a monofilament thread line or, for most products, into a multiplicity of fine filaments that are coalesced shortly after they are formed into a single thread line. LYCRA® is an example of a spandex stretch fiber. Other stretch fibers may also be suitable. For example, but not limited to, fibers presently classified in the polyester textile label classification of the U.S. Federal Trade Commission, but under which a new subclass of "elasterell-p" has been proposed, may also be a suitable stretch fiber as it is described as an inherently elastic, bicomponent textile fiber consisting of two substantially different forms of polyester fibers, and DuPont's version of this fiber is referred to as "T400."

In certain embodiments, one or more stretch fibers can be blended with host fibers that may also be synthetic or natural fibers. Thus, selected ones or blends of stretch fibers can be combined with other natural or synthetic fibers such as cotton, wool, silk, RAYON®, and the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A rod assembly for guiding, routing or feeding a wire and/or cable in a target space of an existing structure having a plurality of frame members and a target internal routing space for the cable or wire, comprising:
    an elongate rod having opposing first and second end portions; and
    an anchoring member attached to said rod first end portion,
    wherein, in position, the anchoring member resides against a surface of a structural frame member to hold the rod first end portion outside of the target internal routing space and allow the rod second end portion to extend into the target internal routing space.

2. A rod assembly according to claim 1, wherein the elongate rod is a glow rod.

3. A rod assembly according to claim 1, further comprising a collar securely attached to said elongate rod first end portion.

4. A rod assembly according to claim 3, wherein, in operation, said collar cooperates with the anchoring member to releaseably engage the rod with the anchoring member.

5. A rod assembly according to claim 4, wherein, in position, the second end portion of the rod is sized and configured to axially slide through said anchoring member until the collar on the first end portion of the rod contacts and rests against the anchoring member to inhibit further axial movement of the rod through the anchoring member, thereby affixing the first end portion of the rod at a desired location on the frame member.

6. A rod assembly according to claim 4, wherein the anchoring member has opposing first and second axially spaced apart end portions defining a rod channel therethrough, the anchoring member configured to reside outside of the target routing space in the structure.

7. A rod assembly according to claim 6, wherein said collar extends radially outwardly from said rod, and wherein the collar is elastomeric.

8. A rod assembly according to claim 6, wherein the collar is releaseably attached to said rod.

9. A rod assembly according to claim 8, wherein the collar is permanently attached to said rod.

10. A rod assembly according to claim 9, wherein the collar is integrally formed on said rod.

11. A rod assembly according to claim 1, wherein the anchoring member has a frustoconical shape.

12. A rod assembly according to claim 1, wherein the anchoring member has a cylindrical segment.

13. A rod assembly according to claim 1, wherein the anchoring member has a plurality of resilient flex arms that extend outwardly to abut the surface of the structural frame member external to the target router space of the structure.

14. A rod assembly according to claim 1, wherein the anchoring member has a disc shaped segment configured to receive the rod therein.

15. A rod assembly according to claim 1, wherein the rod is sized and configured to frictionally engage the anchoring member during use.

16. A method for routing or guiding a cable or wire in a target routing space of a structure, comprising:
    inserting a rod having opposing first and second end portions into a first aperture formed in a structural member of a structure, the first aperture allowing access to a target routing space, so that the second end portion travels through the aperture into the target routing space; and
    anchoring the first end portion of the rod to the structural member so that the first end portion resides external to the first aperture and remains fixed in this position.

17. A method according to claim 16, further comprising:
    directing the second end portion of the rod to exit the target routing space at a second aperture formed in the structure at a position that is spaced apart from the first aperture;
    affixing an anchoring member to the structural member of the structure above the first aperture; and securing the rod first end portion to the anchoring member so that the first end portion resides outside of the first aperture and the target routing space.

18. A method according to claim 17, further comprising forming the first aperture through a horizontal stud in the structure proximate in time and prior to the inserting step, and wherein the inserting step includes inserting the rod substantially vertically through the aperture and directing the rod downwardly in the routing space to the second aperture.

19. A method according to claim 18, wherein the first aperture is a cable outlet region in an upstanding wall, and wherein the inserting step comprises inserting the rod substantially horizontally through the first aperture and then directing the rod to travel upwardly in the routing space to the second aperture.

20. A method according to claim 17, wherein the anchoring member is releaseably attached to said rod.

21. A method according to claim 17, further comprising sliding the second end portion of the rod through the anchoring member after the anchoring member is in position to thereby guide the rod into the routing space.

22. A method according to claim 17, wherein the rod has a stop collar positioned on the first end portion, and wherein the sliding step is carried out until the stop collar engages the anchoring member to hold the first end portion of the rod above and/or outside the first aperture.

23. A method according to claim 17, wherein the anchoring member is fixed to the rod.

24. A method according to claim 17, wherein the anchoring member has a frustoconical shape that is substantially axially aligned with the first aperture to define a rod channel therethrough with first and second end portions with respective first and second diameters, and wherein the first and second diameters are both larger than the aperture.

25. A method according to claim 16, wherein the rod is glow rod.

26. A rod assembly for guiding, routing or feeding a wire and/or cable in a target space of an existing structure having a plurality of frame members and a target internal routing space for the cable or wire, comprising:

an elongate rod having opposing first and second end portions; and means for mounting the elongate rod so that a selected one of the first or second end portions resides against a surface of a structural frame member to hold the selected rod end portion outside of a target internal routing space and allow the opposing end portion to extend into the target internal routing space.

* * * * *